United States Patent [19]
Del Mercado et al.

[11] Patent Number: 6,006,439
[45] Date of Patent: Dec. 28, 1999

[54] APPARATUS FOR CLEANING AND DRYING A PLURALITY OF PLATE LUG SURFACES FOR PRODUCING PORE-FREE CAST-ON-STRAP JOINTS FOR LEAD-ACID BATTERIES

[75] Inventors: Luis Francisco Vazquez Del Mercado, Monterrey; Gregorio Vargas-Gutierrez; Jorge Lopez-Cuevas, both of Saltillo, all of Mexico

[73] Assignee: Acumuladores Mexicanos, S.A. DE C.V., Monterrey, Mexico

[21] Appl. No.: 09/081,748

[22] Filed: May 20, 1998

[51] Int. Cl.⁶ .................................................... F26B 19/00
[52] U.S. Cl. .................... 34/61; 34/164; 34/210; 134/61
[58] Field of Search .............................. 34/526, 560, 562, 34/563, 60, 61, 69, 164, 179, 184, 185, 195, 210; 429/122, 209, 211; 134/10, 26, 30, 40, 61, 76

[56] References Cited

U.S. PATENT DOCUMENTS

| 5,279,032 | 1/1994 | Vargas-Guitierrez et al. | 29/890.02 |
| 5,494,063 | 2/1996 | Suzuki et al. | 134/61 |
| 5,685,086 | 11/1997 | Ferrell | 34/61 |
| 5,918,661 | 6/1999 | Del Mercado et al. | 164/102 |

*Primary Examiner*—Henry Bennett
*Assistant Examiner*—Steve Gravini
*Attorney, Agent, or Firm*—Harrison & Egbert

[57] ABSTRACT

An apparatus for cleaning and chemical activation of a plurality of plate lug surfaces. The apparatus includes an ultrasonically-stirred flux vessel, an ultrasonically-stirred rinsing water vessel and a gas-blowing device contained inside a dirt collection vessel. Each vessel has an independent movement capability in the upward or downward directions, and all three vessels are mounted on a common supporting frame which allows their simultaneous horizontal displacement. When coupled to a conventional cast-on-strap machine, the apparatus allows the manufacture of pore-free cast-on-strap joints for lead-acid batteries.

4 Claims, 2 Drawing Sheets

APPARATUS FOR CLEANING AND DRYING A PLURALITY OF PLATE LUG SURFACES FOR PRODUCING PORE-FREE CAST-ON-STRAP JOINTS FOR LEAD-ACID BATTERIES

TECHNICAL FIELD

The present invention relates generally to the manufacture of batteries. More particularly, the present invention relates to an apparatus to be used for the manufacture of cast-on-strap joints for lead-acid batteries.

BACKGROUND OF THE INVENTION

A lead-acid storage battery is a device which converts chemical energy into electrical energy by means of chemical reactions taking place between a liquid electrolyte (consisting of an aqueous solution of sulfuric acid, $H_2SO_4$), and the active materials of a plurality of lead-based positive and negative plates. These active materials are lead dioxide ($PbO_2$) for the positive plates and sponge lead (Pb) for the negative plates.

A conventional lead-acid battery assembly consists of the cell elements, intercell connectors, a container, a cover, vent plugs and terminal posts. A cell element is formed by stacking together alternate negative and positive plates, with separators. The lugs of the negative plates in the cell element are joined together by a cast-on-strap joint. The same is done to the lugs of the positive plates in the cell element. The cast-on-strap joint of each group of plates is used to connect them in series with the plate groups of adjacent cells, in such a way that the voltage of the battery equals the sum of the voltages of the individual cells. The voltage of a single cell is nominally 2 volts, regardless of the size or quantity of plates. Therefore, a 12-volt battery has six cells and a 6-volt battery has three cells.

The steps followed to manufacture a lead-acid battery are: plate grid casting and preparation of active material pastes; paste application to the plate grids; paste curing; cell element integration operations; plate lugs joining by cast-on-strap process; subsequent battery assembly processes; electrolyte addition to battery cells; electric formation of the battery and final assembly and testing.

The present invention relates to the cast-on-strap process used to join the negative and the positive plates in the cell elements of lead-acid batteries. A casting machine commonly employed to manufacture the cast-on-strap joints comprises four working stations. At station 1, the plate groups are loaded into the machine, their lugs are turn downward and the plates are vibrated to align them up. Then, the plates are moved to station 2, where a two-step cleaning treatment is given to the surface of the plate lugs. The first step of the cleaning treatment involves brushing by means of a rotating horizontal steel brush in order to eliminate lead oxide skins and active material pastes. The second step of the cleaning treatment involves the application, at room temperature, of a film of liquid flux to the freshly brushed plate lugs surface by means of a rotating felt brush or by means of a flux-impregnated sponge. Subsequent processing at station 3 of the machine involves the manufacturing of a pair of lead-based cast-on-strap joints for each cell element, using a suitable water-cooled and preheated metallic mold. In order to do this, the mold cavities are filled, either by gravity or pressurized injection, with a lead-based molten strap alloy of a suitable chemical composition. Then, the flux-impregnated plate lugs are immersed into the molten strap alloy. The cast-on-strap joints are formed by subsequent solidification of the molten strap alloy in the strap mold. The final processing step, carried out at station 4, involves the withdrawal of the cell elements, with the cast-on-strap joints already formed, from the machine.

A characteristic feature of the cell elements, produced by the conventional cast-on-strap process just described, is the presence of a substantial amount of porosity located mainly at the interface between the plate lugs surface and the cast-on-strap joints. This porosity is easily visible in cross-sectioned cast-on-strap joints. This type of defect may result in an accelerated corrosion at the pores, with a consequent reduction in the useful life of the batteries.

In order to determine the causes of the formation of porosity in the cast-on-strap joints obtained by employing the conventional cast-on-strap process, an extensive research program was carried out. The research led to the development of the present invention. It was discovered that the pores found inside the cast-on-strap joints are due mainly to the presence on the plate lugs surface of residues of lead oxides, greases, oils, active material pastes, fluxes, residual reaction products and humidity, all of which produce substantial volumes of gas on heating in contact with the molten lead-based strap alloy. The gases generated during solidification of the cast-on-strap joints cannot be completely eliminated, especially under the fast cooling conditions existing in the metallic mold. Thus, a considerable amount of gas bubbles remain trapped inside the solidified cast-on-strap joints obtained. It was concluded that pore-free cast-on-strap joints cannot be reproducibly produced by employing a conventional cast-on-strap machine. This makes it mandatory to develop a device truly capable of producing pore-free cast-on-strap joints.

The present invention relates to an apparatus for cleaning and chemical activation of a plurality of plate lug surfaces. When this apparatus is used, coupled to a conventional cast-on-strap machine, produces pore-free cast-on-strap joints for lead-acid batteries. The apparatus is based on a process described in a previous patent application (Ser. No. 08/941,531, filed on Sep. 30, 1997). This process comprises the steps of cleaning a plurality of positive and negative plate lugs by a combined action of a liquid flux and ultrasonic vibration, water rinsing the plate lugs under ultrasonic vibration, and drying the plate lugs by gas blowing. The gas blowing occurs prior to the formation of the cast-on-strap joints. The cast-on-strap joints are formed, following the conventional cast-on-strap process, by introducing the plate lugs into a molten lead-based strap alloy contained in a strap mold and solidifying the molten strap alloy in the strap mold.

The use of the apparatus has the present invention replaces the steps of brushing the plate lugs employing a rotating steel brush and application of a film of liquid flux to the plate lugs by means of a rotating felt brush or by means of a flux-impregnated sponge. These operations are commonly carried out at the second station of a conventional cast-on-strap machine. It is an object of the present invention to provide an apparatus for the manufacture of pore-free cast-on-strap joints.

This and other objects and advantages of the present invention will become apparent from a reading of the attached specification and appended claims.

SUMMARY OF THE INVENTION

The present invention is an apparatus for cleaning and chemical activation of a plurality of plate lug surfaces. When coupled to a conventional cast-on-strap machine this apparatus allows the manufacture of pore-free cast-on-strap joints. The apparatus is used to carry out a process (U.S. patent application Ser. No. 08/941,531, filed on Sep. 30, 1997) comprising the steps of: (1) cleaning the plate lug surface by combined action of a liquid flux and ultrasonic vibration; (2) water rinsing under ultrasonic vibration; and (3) drying by gas blowing. This process eliminates the presence of lead oxides, greases, oils, active material pastes, fluxes, residual reaction products and humidity from the surface of the plate lugs. The gases that contact the liquid lead-based strap alloys are reduced or eliminated. As a result, the porosity of the cast-on-strap joints is eliminated. The apparatus claimed in the present invention comprises an ultrasonically-stirred flux vessel, an ultrasonically-stirred rinsing water vessel and a gas-blowing device contained inside a dirt collection vessel. Each vessel has an independent movement capability in the upward or downward directions, and all three vessels are mounted on a common supporting frame which allows their simultaneous horizontal displacement. The use of the apparatus replaces the operations of brushing the plate lugs and application of a film of liquid flux to the brushed plate lugs, which are commonly carried out at the second station of a conventional cast-on-strap machine.

DETAILED DESCRIPTION OF THE PREFERRED EMBODIMENTS

Figure 1:
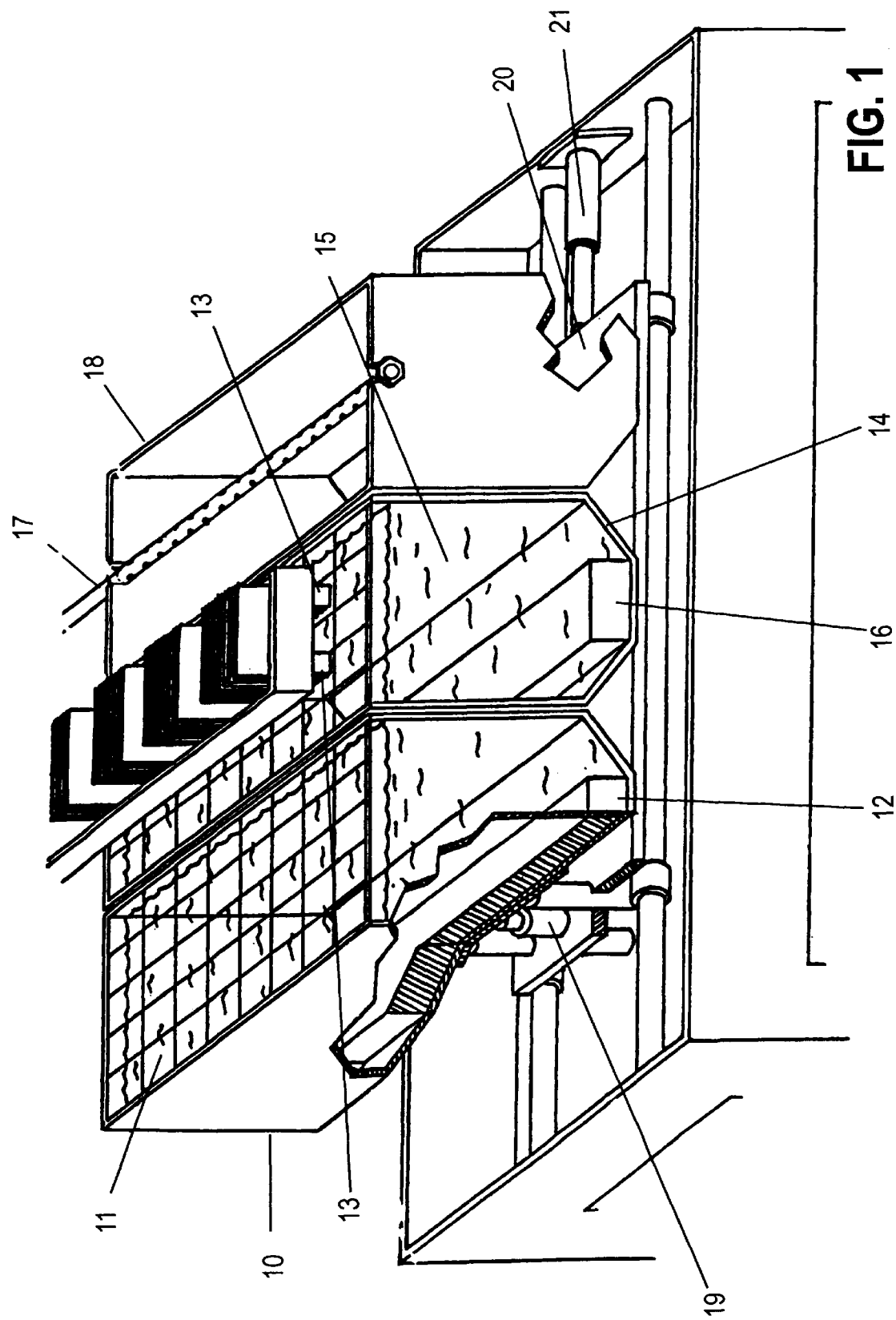
FIG. 1 is an isometric view of the apparatus claimed in the present invention.

Referring to FIG. 1, the main components of the apparatus claimed in the present invention are shown. Thus, the flux vessel 10 is shown which includes a liquid flux 11 and an integral ultrasonic transducer 12 controlled by an ultrasonic power source. The purpose of the system including the flux vessel 10, liquid flux 11 and the ultrasonic transducer 12, is the cleaning and chemical activation of the surfaces of a plurality of plate lugs 13 by elimination of lead oxides, greases, oils, and active material pastes from said plate lug surfaces. Referring again to FIG. 1, the rinsing water vessel 14 is shown including rinsing water 15 and an ultrasonic transducer 16 controlled by an ultrasonic power source. The objective of the ultrasonic water rinsing is the elimination of any residual flux and reaction products from the surface of a plurality of plate lugs 13. In FIG. 1 it is also shown a gas-blowing device 17 placed inside a dirt collection vessel 18. The objective of said gas-blowing device 17 is to remove any dirt and humidity remaining on the surface of a plurality of plate lugs 13 subsequent to their ultrasonic rinsing in water. Each of the vessels 10, 14 and 18 has an independent upward or downward movement capability, which can be attained by different means; for example, by the employment of a pneumatic or hydraulic piston 19 or by a motor-gear mechanism. All three vessels 10, 14 and 18 are mounted on a common supporting frame 20 having a horizontal movement capability. Again, this movement can be attained by the employment of a pneumatic or hydraulic piston 21 or by a motor-gear mechanism. The operational sequence of the apparatus claimed in the present invention, the ultrasonic stirring and gas blowing times can be controlled by using a programmable logic control (PLC) fed with a suitable program.

Figure 2:
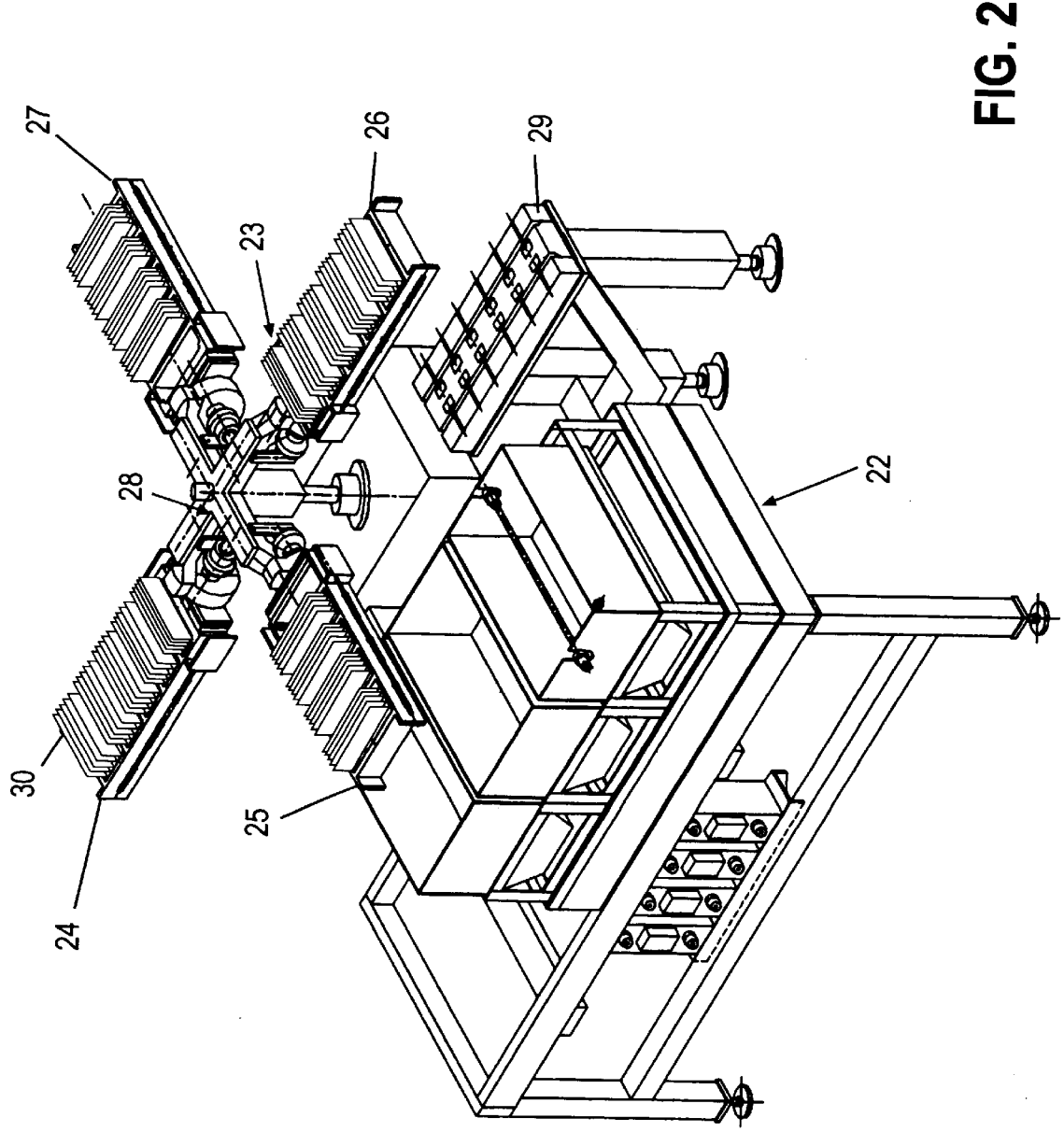
FIG. 2 shows an isometric view of the apparatus claimed in the present invention coupled to a conventional cast-on-strap machine.

The apparatus claimed in the present invention, and shown in FIG. 1, can be coupled to a conventional cast-on-strap machine, replacing the second station of the latter, where the cleaning and chemical activation of a plurality of plate lugs take place. FIG. 2 shows a system having the apparatus 22 of the present invention coupled to a conventional cast-on-strap machine 23 which allows the manufacture of pore-free cast-on-strap joints for lead-acid batteries. FIG. 2 shows also plate group holder 24 positioned at station one, plate group holder 25 positioned at station two, plate group holder 26 positioned at station three, and plate group holder 27 positioned at station four of a conventional cast-on-strap machine 23. All four plate group holders 24, 25, 26 and 27 are joined together forming a cross-shaped rotary turret 28, whose rotary movement allows to position, in an appropriate succession, each one of the plate group holders 24, 25, 26 and 27 at each one of the four stations of the conventional cast-on-strap machine 23. The rotary turret 28 is also provided with a movement capability in the upward or downward directions. FIG. 2 also depicts a metallic mold 29 located at station three of the conventional cast-on-strap machine 23, as well as negative and positive plate groups 30 gripped by plate group holders 24, 25, 26 and 27.

As an illustrative example, a typical operational cycle for the cast-on-strap process using the apparatus claimed in the present invention, shown in FIG. 1 and FIG. 2, coupled to a conventional cast-on-strap machine, is described as follows: loading and alignment of plate groups 30 in plate group holder 24; upward displacement and rotation of rotary turret 28 to place loaded plate group holder 24 at station 2, above flux vessel 10; upward displacement of flux vessel 10 to introduce the plate lugs 13 into the liquid flux 11; application of liquid flux 11 to plate lugs 13 under ultrasonic vibration for 5 seconds; downward displacement of flux vessel 10 to its initial position; horizontal displacement of the common supporting frame 20 to position the rinsing water vessel 14 underneath the plurality of plate lugs 13; upward displacement of rinsing water vessel 14 to introduce the plurality of plate lugs 13 into the rinsing water 15; water rinsing of plate lugs 13 under ultrasonic vibration for 5 seconds; downward displacement of water rising vessel 14 to its previous position; horizontal displacement of the common supporting frame 20 to position the gas-blowing device underneath the plurality of plate lugs 13; upward displacement of the gas-blowing device 17; gas blow applied to plate lugs 13 for 5 seconds; downward displacement of the gas-blowing device 17 to its previous position; horizontal displacement of the common supporting frame 20 to its initial position to re-start the three-step plate lug cleaning and chemical activation treatment process; upward displacement and rotation of rotary turret 28 to place plate group holder 24 at station three above metallic mold 29; pouring of a molten lead-based strap alloy of suitable chemical composition filling the cavities of metallic mold 29; downward displacement of rotary turret 28 in order to introduce the plurality of plate lugs 13 into the molten lead-based strap alloy contained in the cavities of metallic mold 29; after solidification of the lead-based strap alloy in metallic mold 29, upward displacement and rotation of rotary turret 28 to place plate group holder 24 at station four in order to withdraw from the machine the plurality of plate groups already joined by the cast-on-strap process.

Thus, as it has been shown, the present invention includes an apparatus used to clean and chemically activate a plurality of plate lugs using a three-step process. A system having a conventional cast-on-strap machine coupled with the apparatus claimed in the present invention allows the manufacture of pore-free cast-on-strap joints for lead-acid batteries. The foregoing disclosure and description of the invention is illustrative and explanatory thereof. Various changes in the details of the present apparatus can be made within the scope of the appended claims without departing from the true spirit of the invention. The present invention should only be limited by the following claims and their legal equivalents.

We claim:

1. An apparatus for the cleaning and chemical activation of a plurality of plate lug surfaces, comprising:

a vessel containing a liquid flux and an ultrasonic transducer;

a vessel containing water and an ultrasonic transducer;

a vessel containing a gas-blowing device;

means for providing an independent upward or downward movement capability to each one of said vessels;

means for controlling the independent upward or downward movement of each one of said vessels;

common supporting frame for mounting all three said vessels;

means for providing a horizontal movement capability to said common supporting frame;

means for controlling the horizontal movement of said common supporting frame;

means for controlling time and power of ultrasonic stirring for said flux and rinsing water vessels; and means for controlling blowing time, gas pressure and flow rate for said gas-blowing device.

2. The apparatus of claim 1, further comprising:

a plate group holder means interactively connected to said vessels, said plate group holder means for positioning a plurality of plate lugs in proximity to one of said vessels.

3. The apparatus of claim 2, said plate group holder means comprising:

a cross-shaped rotary turret having plate group holders formed thereon; and a movement means connected to said rotary turret for rotating said rotary turret into proximity to one of said vessels.

4. The apparatus of claim 3, and movement means for causing said rotary turret to move in a vertical direction.

* * * * *